Patented Jan. 8, 1935

UNITED STATES PATENT OFFICE 1,987,558

PROCESS OF PRODUCING ALCOHOLS

Anton Hintermaier, Dusseldorf, Germany, assignor to the firm Henkel & Cie. Gesellschaft mit beschrankter Haftung, Dusseldorf, Germany No Drawing. Application October 5, 1932, Serial No. 636,424. In Germany November 14, 1931

2 Claims. (Cl. 260—156)

It has been found, that high yields of alcohols may be easily produced by subjecting mixed anhydrides of organic carboxylic acids and inorganic oxygen-containing acids or mixtures of such substances to a catalytic hydrogenation.

As starting substances for instance acetic-boric-acid-anhydride of the formula $(CH_3.COO)_3B$ or boric-stearinic-acid-anhydride or similar compounds may be used. These compounds may, as further investigations have shown, easily and at low costs be produced in large quantities.

The reaction may, if desired, be carried out as a continuous process and may advantageously be assisted by using hydrogenating catalysts and also by the use of higher pressure and temperature. It is not necessary to perform the reaction with pure hydrogen gas. A mixture of this gas with other gases, such as nitrogen, carbon oxide, carbon dioxide and the like may be used.

The catalysts may consist, for example, of activated zinc-, silver-, nickel- or copper-catalysts, chromite of copper, chromite of nickel and the like. The catalysts may be used in finely divided state. If desired, the catalysts may also be precipitated on carriers such as diatomaceous earth, asbestos and the like. The catalysts should preferably be of a stable type adapted to resist disturbing influences of any kind.

The starting substances are of course used in pre-purified state in order to avoid contamination or "poisoning" of the catalysts.

The reaction products may easily be separated from the catalysts, for example by means of distillation, eventually in vacuum. The products are obtained in a very pure state.

Example 1

To 180 parts by weight of boric-acid-stearic-acid-anhydride, having a melting point of 71° C., 18 parts by weight of a catalyst consisting of chromite of copper are added, and the mass is treated in an autoclave at a temperature of 250° C. and under a pressure of 178 atmospheres with an excess of hydrogen. In the course of about 20 minutes the hydrogen pressure becomes stable. After the mass has cooled the catalyst is filtered off and the filtrate is distillated in vacuum. 94% of the substance passes over at a temperature of 206–208° C. and under a pressure of 13–14 mm. The distillate, which consists of pure octodecylic alcohol, solidifies to a white solid mass which has a melting point of 58° C. The obtained boric acid is filtered off along with the catalyst and may, for instance by distillation with steam, be recovered from this mass.

Example 2

295 parts by weight of boric-acid-lauric-acid-anhydride were reduced together with 10% of a catalyst consisting of chromite of copper in an autoclave provided with a stirring device, at a temperature of 250° C. and under an initial hydrogen pressure of 167 atmospheres. After diluting with benzol the catalyst was filtered off and after removal of the solvent the reaction product was distilled in vacuum. A good yield of dodecylic alcohol having a boiling point of 134–140° under a pressure of 15 mm. was obtained.

Example 3

168 parts by weight of boric-acid-coconut oil acids-acid-anhydride were reduced at a temperature of 250° C. in a hydrogen pressure of 182 atmospheres. The catalyst consisted of chromite of copper, which contained some barium. As soon as the consumption of hydrogen had ceased the reaction product was treated in the usual manner. By this distillation a mixture of higher alcohols was obtained. These alcohols had an acetyl number of 241,6.

Example 4

291 parts by weight of silicic-acid-stearic-acid-anhydride were placed in an autoclave together with 10% of chromite of copper. At an initial temperature of 66° C. hydrogen was forced into the autoclave under a pressure of 130 atmospheres, whereupon the autoclave was heated. The consumption of hydrogen commenced at 180° C. The reduction was completed by heating to 270° C. The product, which was distilled in vacuum, had the acetyl number of 179,2 and consisted of pure octodecylic alcohol having the properties named in Example 1.

Example 5

281 parts by weight of silicic-acid-coconut oil acids-fatty-acid-anhydride were, in the course of 5 hours, reduced with 10% of a catalyst at 250° C. and under a hydrogen pressure of 160 atmospheres. The reaction product was distilled in vacuum. The distillate consisted of a mixture of higher alcohols corresponding to the fatty acids of the coconut oil. The yield was a very good one.

In similar manner silicic-acid-lauric-acid-anhydride was converted into dodecylic alcohol by reducing the substance under high pressure.

I claim:

1. A process of producing aliphatic alcohols containing at least 8 carbon atoms, which comprises heating mixed anhydrides of aliphatic carboxylic acids containing at least 8 carbon atoms and weak inorganic oxygen containing acids together with hydrogen at a temperature of at least 180° C. and under a pressure of at least 130 atmospheres in the presence of a hydrogenating catalyst.

2. A process of producing aliphatic alcohols containing at least 8 carbon atoms which comprises heating mixed anhydrides of aliphatic carboxylic acids containing at least 8 carbon atoms and boric acid with hydrogen at a temperature of at least 180° C. and under a pressure of at least 130 atmospheres in the presence of a hydrogenating catalyst.

ANTON HINTERMAIER.